United States Patent
Zhao et al.

(10) Patent No.: US 9,611,339 B2
(45) Date of Patent: Apr. 4, 2017

(54) SUPPORTED DOUBLE CENTER HYBRID POLYETHYLENE CATALYST, PROCESS FOR PREPARING THE SAME AND USE THEREOF

(71) Applicant: EAST CHINA UNIVERSITY OF SCIENCE AND TECHNOLOGY, Shanghai (CN)

(72) Inventors: Ning Zhao, Shanghai (CN); Ruihua Cheng, Shanghai (CN); Xuelian He, Shanghai (CN); Zhen Liu, Shanghai (CN); Boping Liu, Shanghai (CN)

(73) Assignee: EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 194 days.

(21) Appl. No.: 14/394,269

(22) PCT Filed: Apr. 15, 2013

(86) PCT No.: PCT/CN2013/074190
§ 371 (c)(1),
(2) Date: Oct. 14, 2014

(87) PCT Pub. No.: WO2013/155946
PCT Pub. Date: Oct. 24, 2013

(65) Prior Publication Data
US 2015/0080540 A1    Mar. 19, 2015

(30) Foreign Application Priority Data
Apr. 16, 2012   (CN) .......................... 2012 1 0111109

(51) Int. Cl.
*C08F 10/02*    (2006.01)

(52) U.S. Cl.
CPC .......... *C08F 10/02* (2013.01); *C08F 2410/04* (2013.01)

(58) Field of Classification Search
None
See application file for complete search history.

(56) References Cited

U.S. PATENT DOCUMENTS

| | | | | |
|---|---|---|---|---|
| 3,324,095 A | * | 6/1967 | Carrick | C08F 10/00 502/117 |
| 4,382,020 A | * | 5/1983 | van de Leemput | C08F 10/00 502/107 |
| 6,011,127 A | * | 1/2000 | Monoi | C08F 10/00 526/127 |

* cited by examiner

*Primary Examiner* — Catherine S Branch
(74) *Attorney, Agent, or Firm* — Global IP Services; Tianhua Gu

(57) ABSTRACT

The present invention relates to a carriered hybrid vanadium-chromium-based catalyst, characterized in the catalyst is carriered on a porous inorganic carrier and a V active site and an organic Cr active site are present on the porous inorganic carrier at the same time. The present invention further relates to a process for producing a carriered hybrid vanadium-chromium-based catalyst. The catalyst of the present invention can be used for producing ethylene homopolymers and ethylene/α-olefin copolymers. The hybrid vanadium-chromium-based catalyst can have high activity and produce polyethylene polymers having the properties of broad molecular weight distribution (Part of the products are bimodal distribution) and excellent α-olefin copolymerization characteristic.

11 Claims, 1 Drawing Sheet

SUPPORTED DOUBLE CENTER HYBRID POLYETHYLENE CATALYST, PROCESS FOR PREPARING THE SAME AND USE THEREOF

CROSS REFERENCE TO RELATED PATENT APPLICATION

The present application is the US national stage of PCT/CN2013/074190 filed on Apr. 15, 2013, which claims the priority of the Chinese patent application No. 201210111109.3 filed on Apr. 16, 2012, which application is incorporated herein by reference.

FIELD OF THE INVENTION

The present invention relates to a polyolefin catalyst field, and specifically relates to a novel supported double center hybrid polyethylene catalyst, a process for preparing the same and use thereof.

BACKGROUND OF THE INVENTION

Polyethylene (PE) resin is a thermoplastic plastic polymerized from ethylene homopolymerization and ethylene/α-olefin copolymerization, and is one of the general plastic products with the maximum production and consumption in the world. PE primarily includes low density polyethylene (LDPE), linear to density polyethylene (LLDPE) and high density polyethylene (HDPE), as well as some other polyethylenes having special properties. In terms of the consumption, the main use of LDPE is still will focus on film, piece products and plastic injection products; And in HDPE, consumption structure, blow molding and injection products will be the main application fields. PE has excellent mechanical behavior, electric insulativity, chemical resistance, low temperature resistance and processability, and PE articles are widely applied in various fields, such as industry, agriculture, packing and daily life.

Currently known PE catalysts mainly include Ziegler-Natta (Z-N) type catalysts, chromium catalysts, metallocene catalysts and some other non-metallocene catalysts. Chromium catalysts are very popular in the market due to its prominent contribution to HDPE production and the unsubstitutability of the product thereof. Even today about 50% HDPE is still produced therefrom.

J. P Hogan and R. L. Bank reported in U.S. Pat. No. 2,825,721 a silica gel-supported chromic oxide catalyst, i.e. best known Phillips catalyst. Leonard M. Baker and Wayne L. Carrick disclose in U.S. Pat. Nos. 3,324,101, 3,324,095 and CA759121 an organic chromium catalyst, i.e. S-2 catalyst produced by Union Carbide Company. Although the structure of these two catalysts is almost same, there are different catalytic and polymerization behaviors. Phillips chromic oxide catalyst has high polymerization activity, short induction period; S-2 organic chromium catalyst has low polymerization activity, long induction period, but the product has wider molecule weight distribution. Both of them can satisfy different market requirements and have been widely used.

Although there are various polyolefin catalysts, there are still the requirements on the catalysts having novel properties.

SUMMARY OF THE INVENTION

The purpose of present invention is to obtain a novel supported hybrid vanadium-chromium-based catalyst. By adding vanadium activity component to an organic chromium based catalyst, The novel catalyst not only ensure the produce polyethylene resins having the properties of broad molecular weight distribution, but also improve the content and distribution of comonomer. Also the novel catalyst decrease the content of comonomer in low molecule weight part and increase the content of comonomer in high molecule weight part. Thereby makes the novel catalyst easy to form more tie molecules, obtain higher performance polyethylene products. Additionally the novel catalyst has highly active.

In the present invention, the chemical structure of the organic Cr active site is in a form of

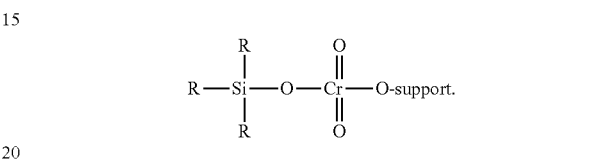

The organic Cr active site mentioned above is also well known by those skilled in the art (see, for example U.S. Pat. No. 3,324,095 and Kevin Cann et al, Macromol. Symp. 2004, 213, 29-36).

In one embodiment of the present invention, the organic chromium precursor for the organic Cr active site above is a compound having following formula

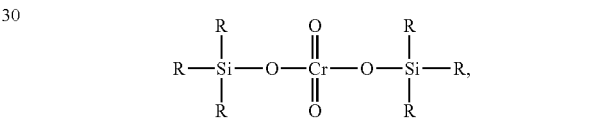

In one embodiment of the present invention, R is an alkyl radical or an aryl radical containing 1 to 14 carbon atoms, preferably from 3 to 10 carbon atoms, and preferably selected from the group consisting of methyl, ethyl, propyl, iso-propyl, n-butyl, iso-butyl, t-butyl, n-pentyl, iso-pentyl, t-pentyl, hexyl, 2-methyl-pentyl, heptyl, octyl, 2-ethylhexyl, nonyl, decyl, hendecyl, dodecyl, tridecyl, tetradecyl, benzyl, phenethyl, p-methylbenzyl, phenyl, tolyl, xylyl, naphthyl, ethyl phenyl, methylnaphthyl and dimethylnaphthyl.

In one embodiment of the present invention, the organic chromium precursor is selected from the group consisting of bis-trimethylsilylchromate, bis-triethylsilylchromate, bis-tributylsilylchromate, bis-triisopentylsilylchromate, bis-tri-2-ethylhexylsilylchromate, bis-tridecylsilylchromate, bis-tri (tetradecyl)silylchromate, bis-tribenzylsilylchromate, bis-triphenethylsilylchromate, bis-triphenylsilylchromate, bis-tritolylsilylchromate, bis-trixylylsilylchromate, bis-trinaphtlaylsilylchromate, bis-triethylphenylsilylchromate, bis-trimethylnaphthylsilylchromate, polydiphenylsilylchromate, polydiethylsilylchromate, and combinations thereof, preferably bis-triphenylsilylchromate (BC).

In one embodiment of the present invention, the vanadium precursor is selected from the group consisting of water-soluble vanadium salts: vanadic nitrate, vanadic phosphate, vanadic sulfate, vanadic acetate and metavanadate, salts, such as ammonium hexafluorovanadate, vanadic acetate, vanadic nitrate, vanadyl oxalate, ammonium metavanadate, vanadyl sulfate, vanadium sulfate oxide hydrate, vanadic sulfate, vanadyl trichloride, sodium orthovanadate, sodium metavanadate, etc. And from the group consisting of water-insoluble vanadium salts: vanadyl bis(acetylacetone), vanadic triisopropoxide oxide, vanadic oxytripropoxide, vanadic acetylacetone, vanadic oxytriethoxide, vanadyl chloride, vanadic silicide, etc. And combinations thereof, preferably vanadic acetylacetone, ammonium metavanadate and ammonium hexafluorovanadate, etc.

In the catalyst of the present invention, the total chromium loading on the inorganic carrier is from 0.01 to 10 wt. %, preferably from 0.05 to 5 wt. % based on the weight of chromium.

In one embodiment of present invention, the ratio of the vanadium loading to the chromium loading on the carrier is 10%~500% (based on the weight of chromium and vanadium). Preferably 20%~400%.

The inorganic carrier used in the present invention may be any inorganic carrier generally used for preparing a catalyst for olefin polymerization. In one embodiment of the present invention, the inorganic carrier is selected from the group consisting of silica, alumina, titanium, zirconia, magnesia, calcium oxide, inorganic clays, and combinations thereof. Said inorganic clays may include, e.g. montmorillonite and the like. In one embodiment of the present invention, the inorganic carrier is selected from the group consisting of unmodified or Ti-, Al- or F-modified silica gel, in particular amorphous porous silica gel. These carriers are well known in the art, and are commercially available or can be synthesized by the known processes. As an example of the silica gel, Davison 955 may be mentioned.

The inorganic carrier has a pore volume of from 0.5 to 5.0 cm$^3$/g.

The inorganic carrier has a surface area of from 50 to 600 m$^2$/g.

In one aspect of the present invention, the present invention provides a process for preparing a supported hybrid vanadium-chromium-based catalyst of the present invention, comprising steps as follows:

i) impregnating an inorganic carrier into an aqueous solution of a vanadium precursor, drying and, calcining at 300~900° C.; and ii) impregnating the product obtained in step i) into a solution of an organic chromium precursor, and then drying.

A preferred process for preparing a supported hybrid vanadium-chromium-based catalyst of the present invention comprises the steps as follows:

i) impregnating an inorganic carrier into an aqueous solution of a vanadium precursor, retaining at a temperature of from room temperature to 60□ for 1~12 h, drying at 100~200 □ for 1~18 h. at this time, the drying can also be speed up by vacuum drying. Then calcining in oxygen or air at 300~900□ for 1~10 h, and cooling, and gas is replaced with inert gases (such as nitrogen, argon, etc.) and cooled to 300~400□;

ii) impregnating the catalyst obtained in step i) into an organic chromium precursor solution under inert atmosphere, reacting at a temperature of room, temperature to 80□ for 1~10 h, followed by drying at 60~120□ for 2~8 h, at this time, the drying can also be speed up by vacuum drying.

Generally, the present invention involves using an inorganic compound as carrier, firstly impregnating vanadium precursor on the inorganic compound, calcining at high temperature to obtain a vanadium supported catalyst precursor; and then adding chromium precursor into a solution containing the above obtained catalyst precursor, to prepare a hybrid vanadium-chromium catalyst.

Said step i) relates to a method of depositing a vanadium precursor onto the inorganic carrier (for example the inorganic carrier mentioned above), and the said method may be any method capable of depositing chromium onto a carrier known by those skilled in the art. The vanadium precursor may be the vanadium precursor mentioned above. In one embodiment of the present invention, the method of depositing a vanadium precursor onto the inorganic carrier comprises impregnating a porous inorganic carrier with an aqueous solution of vanadium precursor. In one embodiment, stirring, preferably continuous stirring, can be implemented during the impregnation. Generally, such stirring lasts about 1 to 24 h, preferably about 2 to 12 h. In one embodiment, the vanadium loading is at most 50 wt. % of the total weight of the catalyst, preferably about 0.01 wt. % to 20 wt. %. Then the resultant vanadium-supporting carrier is dried, generally at a temperature of from about room temperature to 200□, e.g. from about 15□ to 200 □, preferably from about 20□ to 200□, further preferably from about 100□ to 200□. In one embodiment, the drying is conducted at about 150□, can use the vacuum to speed up the drying. The duration period for such drying is not specially limited, but such drying generally lasts from about 1 to 18 h, preferably from about 1.5 to 12 h, further preferably from about 2 to 8 h. e.g. about 200 min. After drying, the vanadium-supported inorganic carrier is calcined. The calcining manner is not specifically limited, but it is preferably conducted in a fluidized bed. In one embodiment, such calcining is carried out in two stages, i.e. low temperature stage and high temperature stage. The low temperature stage is generally conducted at about 200□ to 400□, and the high temperature stage is generally conducted at about 500 to about 900□. Without any theoretical limitation, it is believed that the mechanical water of the carrier is removed during the low temperature stage, and the hydroxyl radical on the inorganic carrier is removed during the high temperature stage. In one embodiment, the low temperature stage lasts from 1 to 10 h, preferably from 2 to 8 h. In another embodiment, the high temperature stage lasts from 1 to 10 h, preferably from 2 to 9 h, more preferably from 3 to 8 h. In one embodiment, the low temperature stage is carried out under an inert atmosphere or air atmosphere, preferably under an inert atmosphere, wherein the inert gas is selected from, e.g. the inert gases as stated above. In one embodiment, the calcining is carried out in oxygen or air, preferable in air. After calcining, the resultant inorganic carrier supporting inorganic oxide V is cooled from the high temperature stage. In one embodiment, when the temperature is decreased to 300-400□, the atmosphere can be changed, e.g. from air to an inert gas, such as nitrogen gas, argon gas, etc. In one embodiment, such cooling is a natural falling of temperature.

Said step (ii) is a method for depositing an organic chromium precursor onto the catalyst precursor. Such a method is well known by those skilled in the art, and said organic chromium precursor may be the organic chromium precursors mentioned above. Generally, the deposition of the organic chromium precursor is carried out after the deposition of the vanadium precursor. In one embodiment, an inorganic carrier (e.g. the inorganic carrier prepared above) supporting V in an inorganic oxide form is placed in a solvent, and an organic chromium precursor is added for depositing the organic chromium precursor. The solvent can be any solvent capable of depositing the organic chromium precursor onto the inorganic carrier, for example the solvent conventionally used in the preparation of S-2 catalysts. For example, the solvent can be alkanes, such as n-pentane, n-hexane, n-heptane, n-octane and the like. In one embodiment, the solvent is n-hexane or n-heptane. In one embodiment, the solvent is a solvent treated by dehydration and deoxidation. In one embodiment, the deposition of the organic chromium precursor is generally carried out under stirring, preferably continuous stirring. The stirring time is not specially limited as long as the reaction is completely conducted. In one embodiment, the stirring lasts from 1 to 24 h, preferably from 2 to 16 h. In one embodiment, the deposition of the organic chromium precursor is carried out under an inert gas atmosphere, such as for example nitrogen atmosphere. In one embodiment, the deposition of the organic chromium precursor is carried out at a temperature of from room temperature to 100☐, e.g. from room temperature to 80☐. In one embodiment, the organic chromium loading is at most 10 wt. % of the total weight of the catalyst, preferably from about 0.01 to 4 wt. %, more preferably from about 0.02 to 3 wt. %. After the completion of the deposition of the organic chromium precursor, the resultant catalyst is dried to remove the solvent so as to obtain the catalyst of the present invention. The drying may be conducted at 30~150☐, preferably 60~120☐. The drying may last for 1~12 h, preferably 2~10 h. In one embodiment, the drying is conducted under an inert gas atmosphere, e.g. atmosphere of nitrogen, helium, argon and the like, preferably nitrogen atmosphere, at this time can use the vacuum to speed up the drying. The resultant catalyst is stored under an inert gas atmosphere.

As an example, the specific operations for preparing the catalyst of the present invention include:

A porous amorphous silica gel is impregnated in an aqueous solution of ammonium metavanadate of a certain concentration, wherein the vanadium precursor concentration enables the vanadium loading to satisfy the requirement in the present application relative to the total weight of the catalyst (e.g. 0.1~10%, based on the weight of vanadium). After being continuously stirred for a certain period of time (e.g. 3~8 h), heated and dried, the silica gel carrier supporting the ammonium metavanadate is high-temperature calcined in a fluidized bed, wherein at the low temperature stage (e.g. 200~400 ☐), the mechanical water of the carrier is removed and at the high temperature stage (e.g. 500~900☐), hydroxyl group on the surface of the silica gel is removed. The high temperature stage lasts a certain period of time (e.g. 3~8 h). Finally, the silica gel was naturally cooled down under the protection of nitrogen gas to obtain a vanadium supported catalyst precursor. Then, by using as solvent a refined hexane or heptane treated by dehydration and deoxidation, chromium precursor, e.g. BC is supported on the vanadium supported catalyst precursor prepared according to the method above, and continuously stirred for a certain period of time (e.g. 3~8 h) in a bottle till complete reaction. The chromium loading from the organic chromium precursor satisfies the requirements in the present application (e.g. from 0.1 to 10 wt. % based on the weight of chromium). Finally the resultant catalyst is dried to remove the solvent and stored under the protection of nitrogen gas.

In one aspect of the present invention, the present invention provides a process for preparing a supported hybrid vanadium-chromium-based catalyst of the present invention, comprising the steps of:

i) impregnating an inorganic carrier into an aqueous solution of a vanadium precursor, drying and calcining at 300~900° C.; and ii) impregnating the product obtained in step i) into a solution of an organic chromium precursor, and, drying. Then using organometallic co-catalysts, to pre-reduction the catalyst precursor. Finally drying and stored.

The co-catalyst above comprises organic aluminum compounds, organic lithium compounds and organic boron compounds, etc. alone, or in combinations of two or more. The co-catalyst are well known for those skilled in the art. In one aspect of the present invention, the aluminum compounds may comprise trialkylaluminum $AlR_3$, dialkylalkoxyaluminum $AlR_2OR$, dialkyl aluminum halide $AlR_2X$, aluminoxanes, triethyldialuminium trichloride and the like, wherein R is an alkyl radical, e.g. having from 1 to 12 carbon atoms, such as methyl, ethyl, n-propyl, iso-propyl, n-butyl, iso-butyl, n-amyl, n-hexyl, n-heptyl, n-octyl, n-nonyl, n-dodecyl and the like; X is halogen, such as fluorine, chlorine, bromine and iodine, preferably chlorine. Said aluminoxane may comprise methyl aluminoxane (MAO). Said aluminum compounds as the co-catalyst can be used alone, or in combinations of two or more. As specific examples, triethylaluminum (TEA), triisobutylaluminum (TIBA), Diethylaluminum chloride (DEAC), Diethylaluminum ethoxide and, methylaluminoxane (MAO) can be used as the aluminum compounds. In one aspect of the present invention, using organometallic co-catalysts to pre-reduction the vanadium-chromium catalyst, the aluminum compound is generally used in an amount of based on aluminum, from 0 to 1,000 mol/mol, preferably From 0 to 100 mol/mol, more preferably from 0 to 50 mol/mol, relative to each mole of Cr. Reduction treatment at a temperature of from about room temperature to 100° C., preferably from room temperature to 60° C. Stirring, preferably continuous stirring, such stirring lasts from about 0.5 to 20 h, preferably from about 0.5 to 10 h. Then drying at 60~120° C. for 2~8 h, under an inert gas atmosphere, (e.g. atmosphere of nitrogen, helium, argon and the like). at this time, also can use the vacuum to speed up the drying. The resultant catalyst is stored under an inert gas atmosphere.

A preferred process for preparing a supported hybrid vanadium-chromium-based catalyst of the present invention comprises the steps of:

i) impregnating an inorganic carrier into an aqueous solution of a vanadium precursor, retaining at a temperature of from room temperature to 60 ☐ for 1~12 h, drying at 100~200☐ for 1~18 h, at this time, a vacuum can also be use to speed up the drying. Then calcining in oxygen or air at 300~900 ☐ for 1~10 h. and cooling, wherein gas is replaced with inert gases (such as nitrogen, argon, etc.) when it is cooled to 300~400☐.

ii) impregnating the catalyst obtained in step i) into an organic chromium, precursor solution under inert atmosphere, reacting at a temperature of from room temperature to 80☐ for 1~10 h, and drying at 60~120☐ for 2~8 h, at this time a vacuum can also be use to speed up the drying. Then using organometallic co-catalysts to pre-reduction the catalyst precursor. Finally drying at 60~120° C. for 2~8 h, at this time, a vacuum can also be use to speed up the drying. The resultant catalyst is stored under an inert gas atmosphere.

Generally, the present invention involves using an inorganic compound as the carrier, firstly impregnating vanadium precursor thereon, calcining at high temperature to obtain a vanadium supported catalyst precursor; and then adding chromium precursor into a solution containing the above obtained catalyst precursor so as to prepare a hybrid vanadium-chromium catalyst. Then using organometallic co-catalysts to pre-reduction the catalyst. The resultant pre-reduction hybrid vanadium-chromium catalyst is stored under an inert gas atmosphere Said step i) relates to a method of depositing a vanadium precursor onto the inorganic carrier (for example the inorganic carrier mentioned above), and such an method may be any method, known by those skilled in the art, capable of depositing chromium onto a carrier. The vanadium precursor may be the vanadium precursor as stated above. In one embodiment of the present invention, the method of depositing a vanadium precursor onto the inorganic carrier comprises impregnating a porous inorganic carrier with an aqueous solution of vanadium precursor. In one embodiment, stirring, preferably continuous stirring, can be implemented during the impregnation. Generally, such stirring lasts from about 1 to 24 h, preferably from about 2 to 12 h. In one embodiment, the vanadium loading is at most 50 wt. % of the total weight of the catalyst, preferably from about 0.01 wt. % to 20 wt. %. Then the resultant vanadium-supporting carrier is dried, generally at a temperature of from about room temperature to 200□, e.g. from about 15□ to 200□, preferably from about 20□ to 200□, further preferably from about 100□ to 200□. In one embodiment, the drying is conducted at about 150□, can use the vacuum to speed up the drying. The duration period for such drying is not specially limited, but such drying generally lasts from about 1 to 18 h, preferably from about 1.5 to 12 h, further preferably from about 2 to 8 h, e.g. about 200 min. After drying, the vanadium-supporting inorganic carrier is calcined. The calcining manner is not specifically limited, but it, is preferably conducted within a fluidized bed. In one embodiment, such calcining is carried out by two stages, i.e. low temperature stage and high temperature stage. The low temperature stage is generally conducted at about 200□ to 400□, and the high temperature stage is generally conducted at about 500 to about 900□. Without any theoretical limitation, it is believed that the mechanical water of the carrier is removed during the to temperature stage, and the hydroxyl radical on the inorganic carrier is removed during the high temperature stage. In one embodiment, the low temperature stage lasts from 1 to 10 h, preferably from 2 to 8 h. In another embodiment, the high temperature stage lasts from 1 to 10 h, preferably from 2 to 9 h, more preferably from 3 to 8 h. In one embodiment, the low temperature stage is carried out under an inert atmosphere or air atmosphere, preferably under an inert atmosphere, wherein the inert gas is selected from, e.g. the inert gases as stated above. In one embodiment, the calcining is carried out in oxygen or air, preferable in air. After calcining, the resultant inorganic carrier supporting inorganic oxide V is cooled from the high temperature stage. In one embodiment, when the temperature is decreased to 300-400□, the atmosphere can be changed, e.g. from air to an inert gas, such as nitrogen gas, argon gas, etc. In one embodiment, such cooling is a natural falling of temperature.

Said step (ii) is a method for depositing an organic chromium precursor onto the catalyst precursor. Such a method is well known by those skilled in the art, and said organic chromium precursor may be the organic chromium precursors as stated above. Generally, the deposition of the organic chromium precursor is carried out after the deposition of the vanadium precursor. In one embodiment, an inorganic carrier (e.g. the inorganic carrier prepared above) supporting V in an inorganic oxide form is placed in a solvent, and an organic chromium precursor is added for depositing the organic chromium precursor. The solvent can be any solvent capable of depositing the organic chromium precursor onto the inorganic carrier, for example the solvent conventionally used in the preparation of S-2 catalysts. For example, the solvent can be alkanes, such as n-pentane, n-hexane, n-heptane, n-octane and the like. In one embodiment, the solvent is n-hexane or n-heptane. In one embodiment, the solvent is a solvent treated by dehydration and deoxidation. In one embodiment, the deposition of the organic chromium precursor is generally carried out under stirring, preferably continuous stirring. The stirring time is not specially limited as long as the reaction is completely conducted. In one embodiment, the stirring lasts from 1 to 24 h, preferably from 2 to 16 h. In one embodiment, the deposition of the organic chromium precursor is carried out under an inert gas atmosphere, such as for example nitrogen atmosphere. In one embodiment, the deposition of the organic chromium precursor is carried out at a temperature of from room temperature to 100□, e.g. from room temperature to 80□. In one embodiment, the organic chromium loading is at most 10 wt. % of the total weight of the catalyst, preferably from about 0.01 to 4 wt. %, more preferably from about 0.02 to 3 wt. %. After the completion of the deposition of the organic chromium precursor, the resultant catalyst is dried to remove the solvent so as to obtain the catalyst of the present invention. The drying may be conducted at 30~150 □, preferably 60~120□. The drying may last for 1~12 h, preferably 2~10 h. In one embodiment, the drying is conducted under an inert gas atmosphere, e.g. atmosphere of nitrogen, helium, argon and the like, preferably nitrogen atmosphere, at this time can use the vacuum to speed up the drying. Then using organometallic co-catalysts to pre-reduction the catalyst precursor. Finally drying at 60~120° C. for 2~8 h, the drying is conducted under an inert gas atmosphere, also can use the vacuum to speed up the drying. The resultant catalyst is stored under an inert gas atmosphere.

As an example, the specific operations for preparing the catalyst of the present invention include:

A porous amorphous silica gel is impregnated in an aqueous solution of ammonium metavanadate of a certain concentration, wherein the vanadium precursor concentration enables the vanadium loading to satisfy the requirement in the present application relative to the total weight of the catalyst (e.g. 0.1~10%, based on the weight of vanadium). After being continuously stirred for a certain period of time (e.g. 3~8 h), heated and dried, the silica gel carrier supporting the ammonium metavanadate is high-temperature calcined in a fluidized bed, wherein at the low temperature stage (e.g. 200~400□), the mechanical water of the carrier is removed and at the high temperature stage (e.g. 500~900 □), hydroxyl group on the surface of the silica gel is removed. The high temperature stage lasts a certain period of time (e.g. 3~8 h). Finally, the silica gel was naturally cooled down under the protection of nitrogen gas to obtain a vanadium supported catalyst precursor. Then, by using as solvent a refined hexane or heptane treated by dehydration and deoxidation, chromium precursor, e.g. BC is supported on the vanadium supported catalyst precursor prepared according to the method above, and continuously stirred for a certain period of time (e.g. 3~8 h) in a bottle till complete reaction. The chromium loading from the organic chromium precursor satisfies the requirements in the present application (e.g. from 0.1 to 10 wt. % based on the weight of chromium). Then using organometallic co-catalysts (e.g. TEA, TIBA, DEAC, Diethylaluminum ethoxide, MAO, etc.) to pre-reduction the catalyst precursor. Finally drying at 60~120° C. for 2~8 h, the drying is conducted under an inert gas atmosphere, also can use the vacuum to speed up the drying. Then the resultant catalyst is stored under an inert gas atmosphere.

The supported hybrid vanadium-chromium-based catalyst (include using organometallic co-catalysts pre-reduction catalyst) of the present invention can be used for producing ethylene homopolymer and ethylene/α-olefin copolymer. According to requirement, The polymerization process may use organometallic co-catalysts, hydrogen, etc.

In another aspect, the present invention provides a process for producing an ethylene homopolymer and ethylene/α- olefin copolymer by using the supported hybrid vanadium-chromium-based catalyst of the present invention, in particular a process for producing an olefin polymer having a broad molecular weight distribution.

As for the process above, the olefin(s) used for polymerization generally comprises ethylene as the polymerization monomer. In one embodiment, the olefin used for polymerization farther comprises a comonomer. The comonomer may be an α-olefin having from 3 to 20 carbon atoms, e.g. propylene, 1-butene, 1-pentene, 1-hexene, 1-heptene, 1-octene, 1-nonene, 1-decene, 1-dodecylene, 4-methyl-1-pentene, 4-methyl-1-hexene and the like, which can be used alone or in combinations of two or more. The comonomer is preferably selected from the group consisting of 1-hexene, 1-octene and 1-decene. When the comonomer exits, the amount thereof generally ranges from 0 to 30 vol. % based on the solvent used during the polymerization.

According to requirement, the polymerization process may use organometallic co-catalysts (for example the organometallic co-catalysts mentioned above). In one embodiment, said organometallic cocalysts may mention organic aluminum compounds. As an organic aluminum compounds example, TEA, TIBA, DEAC, Diethylaluminum ethoxide, MAO, etc. may be mentioned.

The aluminum compound is generally used in an amount of based on aluminum, from 0 to 1000 mol/mol, preferably from 0 to 70 mol/mol, more preferably from 0 to 50 mol/mol, relative to each mole of Cr.

The polymerization may use a molecular weight regulator, such as hydrogen as an example.

As for the aforesaid process for preparing polymers, there is no special limitation to the polymerization process. The processes for preparing olefin polymers by using the hybrid catalyst of the present invention can include gas phase polymerization, slurry polymerization, suspension polymerization, bulk polymerization, solution polymerization and the like. As understood by those skilled in the art, there is no special limitation to the process for preparing olefin polymers by using the hybrid catalyst of the present invention, and the process can be carried out by using the conventional implementation solutions and polymerization conditions of gas phase polymerization, slurry polymerization, suspension polymerization, bulk polymerization and solution polymerization known in the art.

In one embodiment, the slurry polymerization is used, comprising adding into the reaction kettle ethylene, and then adding a solvent and a co-catalyst (an aluminum compound), and optionally adding hydrogen and comonomer(s), and finally adding the hybrid catalyst of the present invention to start the polymerization.

As for the solvent for aforesaid slurry polymerization is also well known by those skilled in the art. May be an alkane having from 3 to 20 carbon atoms, e.g. propane, n-butane, iso-butane, n-pentane, iso-pentane, neopentane, n-hexane, cyclohexane, n-heptane, n-octane and the like, which can be used alone or in combinations of two or more. Preferably iso-butane, iso-pentane, n-hexane, cyclohexane, n-heptane, etc.

More specifically, in one embodiment the polymerization is carried out by the conventional slurry polymerization, and the specific operations are as follows:

The polymerization reaction kettle is firstly heated (100° C.) under vacuum, and then replaced with highly pure nitrogen, which is repeated for three times. A small amount of monomeric ethylene is further used to replace once. Finally, the reaction kettle is filled with ethylene to a slightly positive pressure (0.12 MPa). Into the reaction kettle are added a refined solvent treated by dehydration and deoxidation and a certain amount of alkylaluminium as the co-catalyst. It is also required in the hydrogen regulation and copolymerization experiments to respectively add a certain amount of hydrogen and comonomer(s). Finally, the catalyst of present invention is added to start the polymerization. The instantaneous consumption of monomeric ethylene is on-line collected (by a high-precision ethylene mass flow meter connecting with a computer) during the reaction and recorded by the computer. After the reaction is conducted at a certain temperature (e.g. 35~90□) for a certain period of time (e.g. 1 h), a mixed solution of hydrochloric acid/ethanol is added to terminate the reaction, and the polymer is washed, vacuum dried, weighed and analyzed.

The catalyst of the present invention can produce ethylene homopolymers and ethylene-α-olefin copolymers having a broad molecular weight distribution (MWD=10~60) in a single reactor. Using the hybrid catalyst of the present invention, by changing factors such as the amount of co-catalyst, polymerization temperature, molecular weight regulator and the like, the molecular weight and molecular weight distribution of ethylene homopolymers and ethylene-α-olefin copolymers can be conveniently and readily regulated, so as to conveniently and readily obtain polymers having the required properties.

DESCRIPTION OF THE PREFERRED EMBODIMENTS OF THE INVENTION

The present invention is more detailedly illustrated by reference to the following examples, but is not limited by these examples.

The silica gel used in the examples is Davison 955.

Example 1

Figure 1:
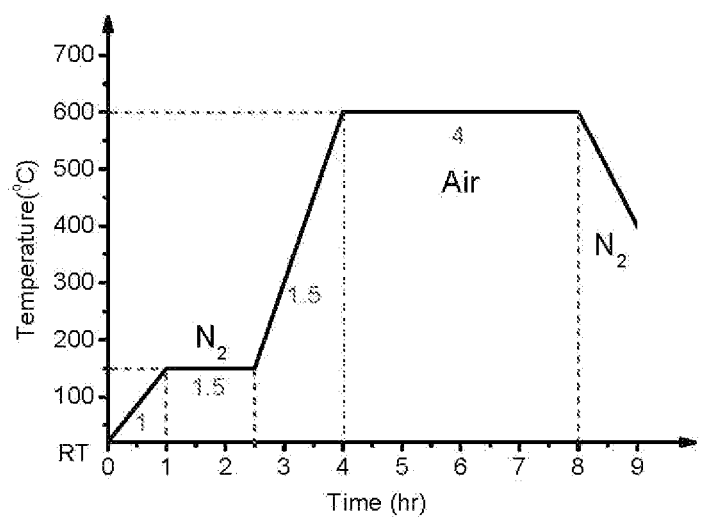
FIG. 1 represents the temperature profile used during the preparation of the vanadium supported catalyst precursor in the examples for preparation of the catalysts of the present invention.

10 g of silica gel (having a pore volume of 1.5~1.7 $cm^3/g$ and a surface area of 250~300 $m^2/g$) was impregnated in an aqueous solution of ammonium metavanadate at 40 □, enabled the vanadium loading (based on the mass of V) to be 0.12%. After being continuously stirred for 5 h, heated to 120□ and dried in air for 12 h, the silica gel carrier supporting the ammonium metavanadate was high-temperature calcined in a fluidized bed. Finally, the silica gel was naturally cooled down under the protection of nitrogen gas to obtain a vanadium supported catalyst precursor. The high temperature calcining and then cooling processes above are shown in FIG. 1. By using as solvent a refined hexane treated by dehydration and deoxidation, an organic chromium his-triphenylsilylchromate (BC) was supported on the vanadium supported catalyst precursor prepared according to the method above, and continuously stirred for 6 h in a bottle at 45□ under the nitrogen atmosphere till complete reaction. The chromium loading (based on the mass of Cr) was 0.25%. Finally, the resultant hybrid catalyst was dried at 80□ under the nitrogen atmosphere for 5 h to remove the solvent and stored under the protection of nitrogen gas.

Example 2

10 g of silica gel (having a pore volume of 1.5~1.7 cm$^3$/g and a surface area of 250~300 m$^2$/g) was impregnated in an aqueous solution of ammonium metavanadate at 40□, enabled the vanadium loading (based on the mass of V) to be 0.24%. After being continuously stirred for 5 h, heated to 120□ and dried in air for 12 h, the silica gel carrier supporting the ammonium metavanadate was high-temperature calcined in a fluidized bed. Finally, the silica gel was naturally cooled down under the protection of nitrogen gas to obtain a vanadium supported catalyst precursor. The high temperature calcining and then cooling processes above are shown in FIG. 1. By using as solvent a refined hexane treated by dehydration and deoxidation, an organic chromium bis-triphenylsilylchromate (BC) was supported on the vanadium supported catalyst precursor prepared according to the method above, and continuously stirred for 6 h in a bottle at 45□ under the nitrogen atmosphere till complete reaction. The chromium loading (based on the mass of Cr) was 0.25%. Finally, the resultant hybrid catalyst was dried at 80□ under the nitrogen atmosphere for 5 h to remove the solvent and stored under the protection of nitrogen gas.

Example 3

10 g of silica gel (having a pore volume of 1.5~1.7 cm$^3$/g and a surface area of 250~300 m$^2$/g) was impregnated in an aqueous solution of ammonium, metavanadate at 40□, enabled the vanadium loading (based on the mass of V) to be 0.48%. After being continuously stirred for 5 h, heated to 120□ and dried in air for 12 h, the silica gel carrier supporting the ammonium metavanadate was high-temperature calcined in a fluidized bed. Finally, the silica gel was naturally cooled down under the protection of nitrogen gas to obtain a vanadium supported catalyst precursor. The high temperature calcining and then cooling processes above are shown in FIG. 1. By using as solvent a refined hexane treated by dehydration and deoxidation, an organic chromium bis-triphenylsilylchromate (BC) was supported on the vanadium supported catalyst precursor prepared according to the method above, and continuously stirred for 6 h in a bottle at 45□ under the nitrogen atmosphere till complete reaction. The chromium loading (based on the mass of Cr) was 0.25%. Finally, the resultant hybrid catalyst was dried at 80□ under the nitrogen atmosphere for 5 h to remove the solvent and stored under the protection of nitrogen gas.

Example 4

10 g of silica gel (having a pore volume of 1.5~1.7 cm$^3$/g and a surface area of 250~300 m$^2$/g) was impregnated in an aqueous solution of ammonium metavanadate at 60□, enabled the vanadium loading (based on the mass of V) to be 0.24%. After being continuously stirred for 5 h, heated to 120 □ and dried in air for 12 h, the silica gel carrier supporting the ammonium metavanadate was high-temperature calcined in a fluidized bed. Finally, the silica gel was naturally cooled down under the protection of nitrogen gas to obtain a vanadium supported catalyst precursor. The high temperature calcining and then cooling processes above are shown in FIG. 1. By using as solvent a refined hexane treated by dehydration and deoxidation, an organic chromium bis-triphenylsilylchromate (BC) was supported on the vanadium supported catalyst precursor prepared according to the method above, and continuously stirred for 6 h in a bottle at 45□ under the nitrogen atmosphere till complete reaction. The chromium loading (based on the mass of Cr) was 0.25%. Finally, the resultant hybrid catalyst was dried at 80 □ under the nitrogen atmosphere for 5 h to remove the solvent and stored under the protection of nitrogen gas.

Example 5

10 g of silica gel (having a pore volume of 1.5~1.7 cm$^3$/g and a surface area of 250~300 m$^2$/g) was impregnated in an aqueous solution of ammonium metavanadate at 40□, enabled the vanadium loading (based on the mass of V) to be 0.24%. After being continuously stirred for 10 h, heated to 120□ and dried in air for 12 h, the silica gel carrier supporting the ammonium metavanadate was high-temperature calcined in a fluidized bed. Finally, the silica gel was naturally cooled down under the protection of nitrogen gas to obtain a vanadium supported catalyst precursor. The high temperature calcining and then cooling processes above are shown in FIG. 1. By using as solvent a refined hexane treated by dehydration and deoxidation, an organic chromium bis-triphenylsilylchromate (BC) was supported on the vanadium supported catalyst precursor prepared according to the method above, and continuously stirred for 6 h in a bottle at 45□ under the nitrogen atmosphere till complete reaction. The chromium loading (based on the mass of Cr) was 0.25%. Finally, the resultant hybrid catalyst was dried at 80□ under the nitrogen atmosphere for 5 h to remove the solvent and stored under the protection of nitrogen gas.

Example 6

10 g of silica gel (having a pore volume of 1.5~1.7 cm$^3$/g and a surface area of 250~300 m$^2$/g) was impregnated in an aqueous solution of ammonium metavanadate at 40□, enabled the vanadium loading (based on the mass of V) to be 0.24%. After being continuously stirred for 5 h, heated to 120□ and dried in air for 12 h. the silica gel carrier supporting the ammonium metavanadate was high-temperature calcined in a fluidized bed. Finally, the silica gel was naturally cooled down under the protection of nitrogen gas to obtain a vanadium supported catalyst precursor. The high temperature calcining and then cooling processes above are shown in FIG. 1. By using as solvent a refined hexane treated by dehydration and deoxidation, an organic chromium bis-triphenylsilylchromate (BC) was supported on the vanadium supported catalyst precursor prepared according to the method above, and continuously stirred for 10 h in a bottle at 45□ under the nitrogen atmosphere till complete reaction. The chromium loading (based on the mass of Cr) was 0.25%. Finally, the resultant hybrid catalyst was dried at 80□ under the nitrogen atmosphere for 5 h to remove the solvent and stored under the protection of nitrogen gas.

Example 7

10 g of silica gel (having a pore Volume of 1.5~1.7 cm$^3$/g and a surface area of 250~300 m$^2$/g) was impregnated in an aqueous solution, of ammonium metavanadate at 40□, enabled the vanadium loading (based on the mass of V) to be 0.24%. After being continuously stirred for 5 h, heated to 120□ and dried in air for 12 h, the silica gel carrier supporting the ammonium metavanadate was high-temperature calcined in a fluidized bed. Finally, the silica gel was naturally cooled down under the protection of nitrogen gas to obtain a vanadium supported catalyst precursor. The high temperature calcining and then cooling processes above are shown in FIG. 1. By using as solvent a refined hexane treated by dehydration and deoxidation, an organic chromium bis-triphenylsilylchromate (BC) was supported on the vanadium supported catalyst precursor prepared according to the method above, and continuously stirred for 6 h in a bottle at 60□ under the nitrogen atmosphere till complete reaction. The chromium loading (based on the mass of Cr) was 0.25%. Finally, the resultant hybrid catalyst was dried at 80□ under the nitrogen atmosphere for 5 h to remove the solvent and stored under the protection of nitrogen gas.

Example 8

10 g of silica gel (having a pore volume of 1.5~1.7 cm$^3$/g and a surface area of 250~300 m$^2$/g) was impregnated in an aqueous solution of ammonium metavanadate at 40□, enabled the vanadium loading (based on the mass of V) to be 0.24%. After being continuously stirred for 5 h, heated to 120□ and dried in air for 12 h, the silica gel carrier supporting the ammonium metavanadate was high-temperature calcined in a fluidized bed. Finally, the silica gel was naturally cooled down under the protection of nitrogen gas to obtain a vanadium supported catalyst precursor. The high temperature calcining and then cooling processes above are shown in FIG. 1. By using as solvent a refined heptane treated by dehydration and deoxidation, an organic chromium bis-triphenylsilylchromate (BC) was supported on the vanadium supported catalyst precursor prepared according to the method above, and continuously stirred for 6 h in a bottle at 45□ under the nitrogen atmosphere till complete reaction. The chromium loading (based on the mass of Cr) was 0.25%. Finally, the resultant hybrid catalyst was dried at 80 □ under the nitrogen atmosphere for 5 h to remove the solvent and stored under the protection of nitrogen gas.

Example 9

10 g of silica gel (having a pore volume of 1.5~1.7 cm$^3$/g and a surface area of 250~300 m$^2$/g) was impregnated in an aqueous solution of vanadic acetylacetone at 40□, enabled the vanadium loading (based on the mass of V) to be 0.24%. After being continuously stirred for 5 h, heated to 120□ and dried in air for 12 h, the silica gel carrier supporting the vanadic acetylacetone was high-temperature calcined in a fluidized bed. Finally, the silica gel was naturally cooled down under the protection of nitrogen gas to obtain a vanadium supported catalyst precursor. The high temperature calcining and then cooling processes above are shown in FIG. 1. By using as solvent a refined hexane treated by dehydration and, deoxidation, an organic chromium bis-triphenylsilylchromate (BC) was supported on the vanadium supported catalyst precursor prepared according to the method above, and continuously stirred for 6 h in a bottle at 45□ under the nitrogen atmosphere till complete reaction. The chromium loading (based on the mass of Cr) was 0.25%. Finally, the resultant hybrid catalyst was dried at 80□ tinder the nitrogen atmosphere for 5 h to remove the solvent and stored under the protection of nitrogen gas.

Example 10

10 g of silica gel (having a pore volume of 1.5~1.7 cm$^3$/g and a surface area of 250~300 m$^2$/g) was impregnated in an aqueous solution of vanadic acetate at 40□, enabled the vanadium loading (based on the mass of V) to be 0.24%. After being continuously stirred for 5 h, heated to 120□ and dried in air for 12 h, the silica gel carrier supporting the vanadic acetate was high-temperature calcined in a fluidized bed. Finally, the silica gel was naturally cooled down under the protection of nitrogen gas to obtain a vanadium supported catalyst precursor. The high temperature calcining and then cooling processes above are shown in FIG. 1. By using as solvent a refined hexane treated by dehydration and deoxidation, an organic chromium bis-triphenylsilylchromate (BC) was supported on the vanadium supported catalyst precursor prepared according to the method above, and continuously stirred for 6 h in a bottle at 45 D under the nitrogen atmosphere till complete reaction. The chromium loading (based on the mass of Cr) was 0.25%. Finally, the resultant hybrid catalyst was dried at 80□ under the nitrogen atmosphere for 5 h to remove the solvent and stored under the protection of nitrogen gas.

Example 11

10 g of silica gel (having a pore volume of 1.5~1.7 cm$^3$/g and a surface area of 250~300 m$^2$/g) was impregnated in an aqueous solution of ammonium hexafluorovanadate at 40□, enabled the vanadium loading (based on the mass of V) to be 0.24%. After being continuously stirred for 5 h, heated to 120□ and dried in air for 12 h, the silica gel carrier supporting the ammonium hexafluorovanadate was high-temperature calcined in a fluidized bed. Finally, the silica gel was naturally cooled down under the protection of nitrogen gas to obtain a vanadium supported catalyst precursor. The high temperature calcining and then cooling processes above are shown in FIG. 1. By using as solvent a refined hexane treated by dehydration and deoxidation, an organic chromium bis-triphenylsilylchromate (BC) was supported on the vanadium supported catalyst precursor prepared according to the method above, and continuously stirred for 6 h in a bottle at 45□ under the nitrogen atmosphere till complete reaction. The chromium loading (based on the mass of Cr) was 0.25%. Finally, the resultant hybrid catalyst was dried at 80□ under the nitrogen atmosphere for 5 h to remove the solvent and stored under the protection of nitrogen gas.

Example 12

10 g of silica gel (having a pore volume of 1.5~1.7 cm$^3$/g and a surface area of 250~300 m$^2$/g) was impregnated in an aqueous solution of ammonium metavanadate at 40° C., enabled the vanadium loading (based on the mass of V) to be 0.24%. After being continuously stirred for 5 h, heated to 120° C. and dried in air for 12 h, the silica gel carrier supporting the ammonium metavanadate was high-temperature calcined in a fluidized bed. Finally, the silica gel was naturally cooled down under the protection of nitrogen gas to obtain a vanadium supported catalyst precursor. The high temperature calcining and then cooling processes above are shown in FIG. I. By using as solvent a refined hexane treated by dehydration and deoxidation, an organic chromium his-triphenylsilylchromate (BC) was supported on the vanadium supported catalyst precursor prepared according to the method above, and continuously stirred for 6 h in a bottle at 45 under the nitrogen atmosphere till complete reaction. The chromium loading (based on the mass of Cr) was 0.25%. Finally, the resultant hybrid catalyst was dried at 80° C. under the nitrogen atmosphere for 5 h to remove the solvent. Respectively used organometallic co-catalysts TIBA (Example 12-1), TEA (Example 12-2), MAO (Example 12-3), Diethylaluminum ethoxide (Example 12-4) and DEAC (Example 12-5) to pre-reduction the catalyst precursor, the concentration of co-catalyst was 1.0 mmol/mL. Finally drying at 60~120° C. for 2~8 h, the drying is conducted under an inert gas atmosphere. Then the resultant catalyst is stored under an inert gas atmosphere.

Example 13

With tetra-n-butyl titanate as precursor, according to the mole ratio of 1:1, dissolved in anhydrous alcohol to obtain fluid A. Then mixed pure water and anhydrous alcohol in mole ratio 1:10 to obtain fluid B. Added concentrated nitric acid to control pH value of fluid in 2~3. Mixed fluid A and fluid 1~3 to obtain $TiO_2$ gel solution, enabled the titanium loading (based on the mass of Ti) to be 5%. Then 10 g of silica gel (having a pore volume of 1.5~1.7 $cm^3/g$ and a surface area of 250~300 $m^2/g$) was impregnated in $TiO_2$ gel solution at room temperature. continuously stirred for 4 h, heated to 120° C. and dried in air for 3~6 h, the silica gel carrier supporting the tetra-n-butyl titanate was high-temperature calcined in a fluidized bed. Then, the silica gel was naturally cooled down under the protection of nitrogen gas to obtain a titanium supported catalyst precursor. Then impregnated titanium supported catalyst precursor in an aqueous solution of ammonium metavanadate at 40° C., enabled the vanadium loading (based on the mass of V) to be 0.24%. After being continuously stirred for 5 h, heated to 120° C. and dried in air for 12 h, the aluminum supported catalyst precursor supporting the ammonium metavanadate was high-temperature calcined in a fluidized bed. Finally, catalyst precursor was naturally cooled down under the protection of nitrogen gas to obtain an titanium-vanadium supported catalyst precursor, The high temperature calcining and then cooling processes above are shown in FIG. 1. By using as solvent a refined hexane treated by dehydration and deoxidation, an organic chromium bis-triphenylsilylchromate (BC) was supported on the titanium-vanadium supported catalyst precursor prepared according to the method above, and continuously stirred for 6 h in a bottle at 45° C. under the nitrogen atmosphere till complete reaction. The chromium loading (based on the mass of Cr) was 0.25%. Finally, the resultant hybrid catalyst was dried at 80° C. under the nitrogen atmosphere for 5 h to remove the solvent and stored under the protection of nitrogen gas.

Example 14

10 g of silica gel (having a pore volume of 1.5~1.7 $cm^3/g$ and a surface area of 250~300 $m^2/g$) was impregnated in hexane solution of tetra-n-butyl titanate at room temperature, enabled the titanium loading (based on the mass of Ti) to be 5%. continuously stirred for 4 h, heated to 120° C. and dried in air for 3~6 h, the silica gel carrier supporting the tetra-n-butyl titanate was high-temperature calcined in a fluidized bed. Then, the silica gel was naturally cooled down under the protection of nitrogen gas to obtain a titanium supported catalyst precursor. Then impregnated titanium supported catalyst precursor in an aqueous solution of ammonium metavanadate at 40° C., enabled the vanadium loading (based on the mass of V) to be 0.24%. After being continuously stirred for 5 h, heated to 120° C. and dried in air for 12 h, the aluminum supported catalyst precursor supporting the ammonium metavanadate was high-temperature calcined in a fluidized bed. Finally, catalyst precursor was naturally cooled down under the protection of nitrogen gas to obtain an titanium-vanadium supported catalyst precursor. The high temperature calcining and then cooling processes above are shown in FIG. 1. By using as solvent a refined hexane treated by dehydration and deoxidation, an organic chromium bis-triphenylsilylchromate (BC) was supported on the titanium-vanadium supported catalyst precursor prepared according to the method above, and continuously stirred for 6 h in a bottle at 45° C. under the nitrogen atmosphere till complete reaction. The chromium loading (based on the mass of Cr) was 0.25%. Finally, the resultant hybrid catalyst was dried at 80° C. under the nitrogen atmosphere for 5 h to remove the solvent and stored under the protection of nitrogen gas.

Example 15

10 g of silica gel (having a pore volume of 1.5~1.7 $cm^3/g$ and a surface area of 250~300 $m^2/g$) was impregnated in an aqueous solution of aluminium nitrate at room temperature, enabled the aluminum loading (based on the mass of Al) to be 2%. continuously stirred for 4~6 h, heated to 120° C. and dried in air for 8 h, the silica gel carrier supporting the aluminium nitrate was high-temperature calcined in a fluidized bed. Then, the silica gel was naturally cooled down under the protection of nitrogen gas to obtain an aluminum supported catalyst precursor. Then impregnated aluminum supported catalyst precursor in an aqueous solution of ammonium metavanadate at 40° C., enabled the vanadium loading (based on the mass of V) to be 0.24%. After being continuously stirred for 5 h, heated to 120° C. and dried in air for 12 h, the aluminum supported catalyst precursor supporting the ammonium metavanadate was high-temperature calcined in a fluidized bed. Finally, catalyst precursor was naturally cooled down under the protection of nitrogen gas to obtain an aluminum-vanadium supported catalyst precursor. The high temperature calcining and then cooling processes above are shown in FIG. 1. By using as solvent a refined hexane treated by dehydration and deoxidation, an organic chromium bis-triphenylsilylchromate (BC) was supported on the aluminum-vanadium supported catalyst precursor prepared according to the method above, and continuously stirred for 6 h in a bottle at 45° C. under the nitrogen atmosphere till complete reaction. The chromium loading (based on the mass of Cr) was 0.25%. Finally, the resultant hybrid catalyst was dried at 80° C. under the nitrogen atmosphere for 5 h to remove the solvent and stored under the protection of nitrogen gas.

Example 16

10 g of silica gel (having a pore volume of 1.5~1.7 $cm^3/g$ and a surface area of 250~300 $m^2/g$) was impregnated in an aqueous solution of ammonium fluosilicate at room temperature, enabled the fluorine loading (based on the mass of F) to be 1.5%. continuously stirred for 4~6 h, heated to 120° C. and dried in an for 8 h, the silica gel carrier supporting the ammonium fluosilicate was high-temperature calcined in a fluidized bed. Then, the silica gel was naturally cooled down under the protection of nitrogen gas to obtain a fluorine supported catalyst precursor. Then impregnated fluorine supported catalyst precursor in an aqueous solution of ammonium metavanadate at 40° C., enabled the vanadium loading (based on the mass of V) to be 0.24%. After being continuously stirred for 5 h, heated to 120° C. and dried in air for 12 h, the fluorine supported catalyst precursor supporting the ammonium metavanadate was high-temperature calcined in a fluidized bed. Finally, catalyst precursor was naturally cooled down under the protection of nitrogen gas to obtain a fluorine-vanadium supported catalyst precursor. The high temperature calcining and then cooling processes above are shown in FIG. 1. By using as solvent a refined hexane treated by dehydration and deoxidation, an organic chromium bis-triphenylsilylchromate (BC) was supported on the fluorine-vanadium supported catalyst precursor prepared according to the method above, and continuously stirred for 6 h in a bottle at 45° C. under the nitrogen atmosphere till complete reaction. The chromium loading (based on the mass of Cr) was 0.25%. Finally, the resultant hybrid catalyst was dried at 80° C. under the nitrogen atmosphere for 5 h to remove the solvent and stored under the protection of nitrogen gas.

Example 17

200 mg of the hybrid catalyst in Example 1~11 and Example 13~16 was weighed for the polymerization respectively. The polymerization reaction kettle was firstly heated (100° C.) under vacuum, and then replaced with highly pure nitrogen, which vas repeated for three times. Then a small amount of monomeric ethylene was used to replace once. Finally, the reaction kettle was filled with, ethylene to a slight positive pressure (0.12 MPa). The polymerization temperature was maintained at 90□. Into the reaction kettle were added in turn about 70 ml of a refined heptane treated by dehydration and deoxidation as solvent and TIBA as co-catalyst, wherein the co-catalyst had a concentration of 1.0 mmol/mL, (n-hexane solution) and was in an amount of 0.29 mL, i.e. Al/Cr (molar ratio)=30. Finally the pressure of ethylene in the kettle was raised to 1.0 MPa and the hybrid catalyst was added to start the polymerization. The instantaneous consumption of monomeric ethylene was on-line collected (by the high-precision ethylene mass flow meter connecting with a computer) during the reaction and recorded by the computer. After the reaction was conducted at 90□ for 1 h, a mixed solution of hydrochloric acid/ethanol was added to terminate the reaction, and the polymer was vacuum dried, weighed and analyzed.

Example 18

200 mg of the hybrid catalyst in Example 12 was weighed for the polymerization. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 90° C. Into the reaction kettle were added in turn about 70 ml of a refined heptane treated by dehydration and deoxidation as solvent. Finally the pressure of ethylene in the kettle was raised to 1.0 MPa and the hybrid catalyst was added to start the polymerization. The instantaneous consumption of monomeric ethylene was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

Example 19

200 mg of the hybrid catalyst in Example 2 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 90° C. Into the reaction kettle were added in turn about 70 ml of a refined heptane treated by dehydration and deoxidation as solvent and TIBA (Example 19-1), TEA (Example 19-2), MAO (Example 19-3), Diethylaluminum ethoxide (Example 19-4) and DEAC (Example 19-5) as co-catalyst respectively, wherein the co-catalyst had a concentration of 1.0 mmol/mL (n-hexane solution) and was in an amount of 0.29 mL i.e. Al/Cr (molar ratio)=30. Finally the pressure of ethylene in the kettle was raised to 1.0 MPa and the hybrid catalyst was added to start the polymerization. The instantaneous consumption of monomeric ethylene, was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

Example 20

200 mg of the hybrid catalyst in Example 2 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 90° C. Into the reaction kettle were added in turn about 70 ml of a refined heptane treated by dehydration and deoxidation as solvent and TIBA as co-catalyst, wherein the co-catalyst had a concentration of 1.0 mmol/mL (n-hexane solution) and was in an amount of 0.10 mL, 0.19 mL, 0.29 mL, 0.38 mL and 0.48 mL respectively, i.e. Al/Cr (molar ratio)=10 (Example 20-1), 20 (Example 20-2), 30 (Example 20-3), 40 (Example 20-4) and 50 (Example 20-5). Finally the pressure of ethylene in the kettle was raised to 1.0 MPa and the hybrid catalyst was added to start the polymerization. The instantaneous consumption of monomeric ethylene was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

Example 21

200 mg of the hybrid catalyst in Example 2 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 90° C. Into the reaction kettle were added in turn about 70 ml of a refined heptane treated by dehydration and deoxidation as solvent and TIBA as co-catalyst, wherein the co-catalyst had a concentration of 1.0 mmol/mL (n-hexane solution) and was in an amount of 0.29 mL i.e. Al/Cr (molar ratio)=30. Finally the pressure of ethylene in the kettle was raised to 0.4 MPa (Example 20-1), 0.6 MPa (Example 20-2), 0.8 MPa (Example 20-3) and 1.0 MPa (Example 20-4)

respectively and the hybrid catalyst was added to start the polymerization. The instantaneous consumption of monomeric ethylene was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

Example 22

200 mg of the hybrid catalyst in Example 2 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 90° C. Into the reaction kettle were added in turn about 70 ml of a refined heptane treated by dehydration and deoxidation as solvent, a refined 1-hexene treated by dehydration and deoxidation, and TIBA as co-catalyst, wherein the co-catalyst had a concentration of 1.0 mmol/mL (n-hexane solution) and was in an amount of 0.29 mL i.e. Al/Cr (molar ratio)=30. The amount of 1-hexene was respectively 2 mL, 6 mL, 10 mL and 14 mL, i.e. the volume ratio of 1-hexene and the solvent used for polymerization being 1 vol % (Example 22-1), 3 vol % (Example 22-2), 5 vol % (Example 22-3) and 7 vol % (Example 22-4). Finally the pressure of ethylene in the kettle was raised to 1.0 MPa and the hybrid catalyst was added to start the polymerization. The instantaneous consumption of monomeric ethylene was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

Example 23

200 mg of the hybrid catalyst in Example 2 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 90° C. Into the reaction kettle were added in turn about 70 ml of a refined heptane treated by dehydration and deoxidation as solvent, a refined 1-hexene treated by dehydration and deoxidation, and TIBA as co-catalyst, wherein the co-catalyst had a concentration of 1.0 mmol/mL (n-hexane solution) and was in an amount of 0.10 mL, 0.19 mL, 0.29 mL, 0.38 mL, and 0.48 mL respectively, i.e. Al/Cr (molar ratio)=10 (Example 23-1), 20 (Example 23-2), 30 (Example 23-3), 40 (Example 23-4) and 50 (Example 23-5). The amount of 1-hexene was 6 mL, i.e. the volume ratio of 1-hexene and the solvent used for polymerization being 3 vol %. Finally the pressure of ethylene in the kettle was raised to 1.0 MPa and the hybrid catalyst was added to start the polymerization. The instantaneous consumption of monomeric ethylene was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

Example 24

200 mg of the hybrid catalyst in Example 2 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 90° C. Into the reaction kettle were added in turn about 70 ml of a refined heptane treated by dehydration and deoxidation as solvent, TIBA as co-catalyst and hydrogen as molecular weight regulator, wherein the co-catalyst had a concentration of 1.0 mmol/mL (n-hexane solution) and was in an amount of 0.29 mL i.e. Al/Cr (molar ratio)=30. The volume ratio of hydrogen and the volume of reaction kettle used for polymerization being 1 vol % (Example 24-1), 3 vol % (Example 24-2), 5 vol % (Example 24-3) and 7 vol % (Example 24-4) respectively. Finally the pressure of ethylene in the kettle was raised to 1.0 MPa and the hybrid catalyst was added to start the polymerization. The instantaneous consumption of monomeric ethylene was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

Example 25

200 mg of the hybrid catalyst in Example 2 was weighed for the polymerization respectively. The polymerization reaction kettle was firstly heated (100° C.) under vacuum, and then replaced with highly pure nitrogen, which was repeated for three times. Then a small amount of monomeric ethylene was used to replace once. Finally, the reaction kettle was filled with ethylene to a slight positive pressure (0.12 MPa). The polymerization temperature was maintained at 90° C. Into the reaction kettle were added in turn about 70 ml of a refined heptane treated by dehydration and deoxidation as solvent, a refined 1-hexene treated by dehydration and deoxidation, TIBA as co-catalyst and hydrogen as molecular weight regulator, wherein the co-catalyst had a concentration of 1.0 mmol/mL (n-hexane solution) and was in an amount of 0.29 mL i.e. Al/Cr (molar ratio)=30. The volume ratio of hydrogen and the volume of reaction kettle used for polymerization being 1 vol % (Example 25-1), 3 vol % (Example 25-2), 5 vol % (Example 25-3) and 7 vol % (Example 25-4) respectively. The amount of 1-hexene was 6 mL, i.e. the volume ratio of 1-hexene and the solvent used for polymerization being 3 vol %. Finally the pressure of ethylene in the kettle was raised to 1.0 MPa and the hybrid catalyst was added to start the polymerization. The instantaneous consumption of monomeric ethylene was on-line collected (by the high-precision ethylene mass flow, meter connecting with a computer) during the reaction and recorded by the computer. After the reaction was conducted at 90° C. for 1 h, a mixed solution of hydrochloric acid/ ethanol was added to terminate the reaction, and the polymer was vacuum dried, weighed and analyzed.

Comparison Example 1

Figure 2:
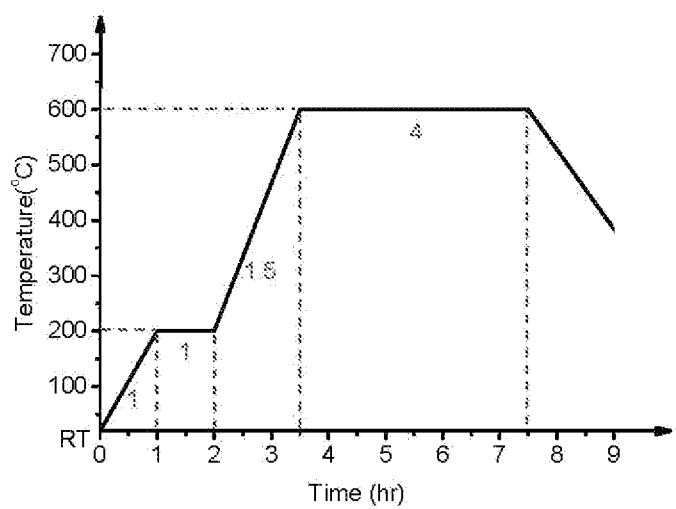
FIG. 2 represents the process of treating the silica gel carrier at 600□ in Comparison Example 1.

10 g of silica gel (having a pore volume of 1.5~1.7 cm³/g and a surface area of 250~300 m²/g) was treated at 600° C. (see FIG. 2 for the treating process). By using as solvent a refined hexane treated by dehydration and deoxidation, chromium precursor BC was supported OD treated silica gel carrier, continuously stirred for 6 h in a bottle at 45□ under the nitrogen atmosphere till complete reaction. The chromium loading (based on the mass of Cr) was 0.25% to prepare a S-2 catalyst. 200 mg of said S-2 catalyst above were weighed for the polymerization. The polymerization reaction kettle was firstly heated (100° C.) under vacuum, and then replaced with highly pure nitrogen, which was repeated for three times. A small amount of monomeric ethylene was used to replace once. Finally, the reaction kettle was filled with ethylene to a slight positive pressure (0.12 MPa). The polymerization temperature was maintained at 90□. Into the reaction kettle were added in turn about 70 ml of a refined heptane treated by dehydration and deoxidation as solvent and TIBA as co-catalyst, wherein the co-catalyst had a concentration of 1.0 mmol/mL (n-hexane solution) and was in an amount of 0.29 mL, i.e. Al/Cr (molar ratio)=30. Finally the pressure of ethylene in the kettle was raised to 1.0 MPa and the catalysts were added. The instantaneous consumption of monomeric ethylene was on-line collected (by the high-precision ethylene mass flow meter connecting with a computer) during the reaction and recorded by the computer. After the reaction was conducted at 90□ for 1 h, a mixed solution of hydrochloric acid/ethanol was added to terminate the reaction, and the polymer was vacuum dried, weighed and analyzed.

Comparison Example 2

10 g of silica gel (having a pore volume of 1.5~1.7 cm³/g and a surface area of 250~300 m²/g) was impregnated in an aqueous solution of ammonium metavanadate at 40° C., enabled the vanadium loading (based on the mass of V) to be 0.24%. After being continuously stirred for 5 h, heated to 120° C. and dried in air for 12 h, the silica gel carrier supporting the ammonium metavanadate was high-temperature calcined in a fluidized bed. Finally, the silica gel was naturally cooled down under the protection of nitrogen gas to obtain a silica supported vanadium catalyst. The high temperature calcining and then cooling processes above are shown in FIG. 1. 200 mg of said silica supported vanadium catalyst above were weighed for the polymerization. The polymerization reaction kettle was firstly heated (100° C.) under vacuum, and then replaced with highly pure nitrogen, which was repeated for three times. A small amount of monomeric ethylene was used to replace once. Finally, the reaction kettle was filled with ethylene to a slight positive pressure (0.12 MPa). The polymerization temperature was maintained at 90° C. Into the reaction kettle were added in turn about 70 ml of a refined heptane treated by dehydration and deoxidation as solvent and TIBA as co-catalyst, wherein the co-catalyst had a concentration of 1.0 mmol/mL (n-hexane solution) and was in an amount of 0.29 mL, i.e. Al/Cr (molar ratio)=30. Finally the pressure of ethylene in the kettle was raised to 1.0 MPa and the catalysts were added. The instantaneous consumption of monomeric ethylene was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

Comparison Example 3

The two catalysts in Comparison Example 1 and Comparison Example 2 were mechanically mixed in a mixing ratio of 1:1. 200 mg of said mixed catalyst above were weighed for the polymerization. The polymerization reaction kettle was firstly heated (100° C.) under vacuum, and then replaced with highly pure nitrogen, which was repeated for three times. A small amount of monomeric ethylene was used to replace once. Finally, the reaction kettle was filled with ethylene to a slight positive pressure (0.12 MPa). The polymerization temperature was maintained at 90° C. Into the reaction kettle were added in turn about 70 ml of a refined heptane treated by dehydration and deoxidation as solvent and TIBA as co-catalyst, wherein the co-catalyst had a concentration of 1.0 mmol/mL (n-hexane solution) and was in an amount of 0.29 mL, i.e. Al/Cr (molar ratio)=30. Finally the pressure of ethylene in the kettle was raised to 1.0 MPa and the catalysts were added. The instantaneous consumption of monomeric ethylene was on-line collected (by the high-precision ethylene mass flow meter connecting with a computer) during the reaction and recorded by the computer. After the reaction was conducted at 90° C. for 1 h, a mixed solution of hydrochloric acid/ethanol was added to terminate the reaction, and the polymer was vacuum dried, weighed and analyzed.

(1) Comparison of different catalysts on ethylene homopolymerization

TABLE 1

Effect of different catalysts on the ethylene homopolymerization

| Example | Polymerization activity[a] (kgPE/molCr · hr) | Melting point (° C.) | Weight average molecular weight (×10⁵) | Molecular weight distribution |
|---|---|---|---|---|
| Comparison Example 1 | 855 | 132 | 6.8 | 35.9 |
| Comparison Example 1 | 165 | 131 | 8.4 | 28.5 |
| Comparison Example 1 | 466 | 130 | 7.6 | 30.2 |
| Example 2, Example 17 | 1274 | 133 | 8.0 | 29.9 |

[a]if the catalyst without chromium loading, the polymerization activity calculated by vanadium loading.

Polymerization conditions: ethylene pressure=1.0 MPa; polymerization time=1 hr; polymerization temperature=90° C.; n-heptane=200 mL; catalyst amount=200 mg; chromium loading=0.25 wt. %; co-catalyst=TIBA; Al/Cr ratio=30.

Table 1 shows the results of ethylene polymerization use different catalysts. According to Table 1, it can be seen that, the activity of hybrid catalyst is obviously higher than activity of S-2 catalyst, silica supported vanadium catalyst and mixed catalyst. There is great advantage of the hybrid catalyst in the polymerization activity.

(2) Effect of content of vanadium

TABLE 2

Effect of content of vanadium on the ethylene homopolymerization

| Example | Polymerization activity[a] (kgPE/molCr · hr) | Melting point (° C.) | Weight average molecular weight (×10$^5$) | Molecular weight distribution |
|---|---|---|---|---|
| Comparison Example 1 | 855 | 132 | 6.8 | 35.9 |
| Example 1, Example 17 | 1177 | 131 | 7.4 | 33.4 |
| Example 2, Example 17 | 1274 | 133 | 8.0 | 29.9 |
| Example 3, Example 17 | 1542 | 132 | 9.2 | 27.1 |

[a]if the catalyst without chromium loading, the polymerization activity calculated by vanadium loading.

Polymerization conditions: ethylene pressure=1.0 MPa; polymerization time=1 hr; polymerization temperature=90° C.; n-heptane=200 mL; catalyst amount-200 mg; chromium loading=0.25 wt. %; co-catalyst-MA; Al/Cr ratio=30.

Table 2 shows the results of ethylene polymerization of the catalysts with different content of vanadium, it can be seen that, with the content of the V component increased, the activity of ethylene polymerization continues to increase. By analyses of the polyethylene products, along with the increase of the vanadium addition amount, the high molecular weight part increase obviously and the molecular weight distribution narrowed, but the melting points of the products are still very close.

(3) Effect of co-catalysts

TABLE 3

Effect of different co-catalysts on the ethylene homopolymerization

| Example | Polymerization activity (kgPE/molCr · hr) | Melting point (° C.) | Weight average molecular weight (×10$^5$) | Molecular weight distribution |
|---|---|---|---|---|
| Example 19-1 | 1274 | 133 | 8.0 | 29.9 |
| Example 19-2 | 986 | 132 | 5.2 | 27.3 |
| Example 19-3 | 545 | 130 | 6.5 | 26.5 |
| Example 19-4 | 347 | 131 | 6.9 | 27.4 |
| Example 19-5 | 673 | 131 | 6.1 | 25.9 |

Polymerization conditions: ethylene pressure=1.0 MPa; polymerization time=1 hr; polymerization temperature=90° C.; n-heptane=200 mL; catalyst amount=200 mg; chromium Loading 0.25 wt. %; Al/Cr ratio=30.

Table 3 shows the results of ethylene polymerization with different co-catalysts. From the result, we can find that the activity of ethylene polymerization with TIBA is higher than the activity of ethylene polymerization with other co-catalysts. And the molecule weight of the polyethylene product by TIBA is higher than others.

TABLE 4

Effect of co-catalysts amount on the ethylene homopolymerization.

| Example | Polymerization activity (kgPE/molCr · hr) | Melting point (° C.) | Weight average molecular weight (×10$^5$) | Molecular weight distribution |
|---|---|---|---|---|
| Example 20-1 | 575 | 133 | 4.8 | 24.1 |
| Example 20-2 | 1140 | 131 | 6.7 | 27.3 |
| Example 20-3 | 1274 | 133 | 8.0 | 29.9 |
| Example 20-4 | 1054 | 131 | 9.1 | 35.2 |
| Example 20-5 | 873 | 132 | 9.6 | 42.1 |

Polymerization conditions: ethylene pressure=1.0 MPa; polymerization time=1 hr; polymerization temperature=90° C.; n-heptane-200 mL catalyst amount=200 mg; chromium loading 0.25 wt. %; co-catalyst=TIBA.

According to Table 4, it can be seen that, under the conditions that TIBA is used as co-catalyst, the activities of the compounded catalysts in ethylene homopolymerization firstly increase and then decrease along with the increase of the co-catalyst amount, which shows that the amount of the co-catalyst has a suitable value or range in order to achieve a high polymerization activity. There is also similar rule for other co-catalysts than TIBA. And along with the increase of the co-catalyst amount, the high molecular weight part of the product continues to increase.

(4) Effect of ethylene pressure

TABLE 5

Effect of ethylene pressure on the ethylene homopolymerization

| Example | Polymerization activity (kgPE/molCr · hr) | Melting point (° C.) | Weight average molecular weight (×10$^5$) | Molecular weight distribution. |
|---|---|---|---|---|
| Example 21-1 | 633 | 131 | 4.1 | 25.4 |
| Example 21-2 | 827 | 131 | 5.2 | 27.1 |
| Example 21-3 | 1045 | 132 | 6.9 | 28.8 |
| Example 21-4 | 1274 | 133 | 8.0 | 29.9 |

Polymerization conditions: polymerization time=1 hr; polymerization temperature 90° C.; n-heptane=200 mL; catalyst amount-200 mg; chromium loading=0.25 wt. %; co-catalyst=TIBA; Al/Cr ratio=30.

Table 5 shows the results of ethylene polymerization in different ethylene pressure. with the pressure of ethylene increased, the activity of ethylene polymerization continues to increase obviously. By analyses of the polyethylene products, along with the increase of the pressure of ethylene, the molecular weight also increased.

(5) Effect of 1-hexene amount on ethylene/1-hexene copolymerization

TABLE 6

Effect of the addition amount of 1-hexene on ethylene/1-hexene copolymerization

| Example | Polymerization activity (kgPE/molCr · hr) | Melting point (° C.) | Weight average molecular weight (×10$^5$) | Molecular weight distribution |
|---|---|---|---|---|
| Example 22-1 | 1154 | 133 | 8.6 | 31.5 |
| Example 22-2 | 1048 | 128 | 7.8 | 38.0 |
| Example 22-3 | 978 | 122 | 7.9 | 43.6 |
| Example 22-4 | 841 | 121 | 8.2 | 48.8 |

Polymerization conditions: ethylene pressure=1.0 MPa; polymerization time=1 hr; polymerization temperature=90° C.; n-heptane=200 mL; catalyst amount=200 mg; chromium loading=0.25 wt. %; co-catalyst=TIBA; Al/Cr ratio=30.

Table 6 shows the results of ethylene/1-hexene copolymerization. The ethylene/1-hexene copolymerization activity shows a decreasing tendency, and shows by comparing with the previous ethylene homopolymerization results that the ethylene/1-hexene copolymerization activities all are lower than those of ethylene homopolymerization. The addition of the 1-hexene makes the melting point of the product polyethylene lower than the homopolymerization product, and the decrease is obvious along with the increase of the addition amount. And along with the increase of the addition amount, the low molecule weight part increase and molecule weight distribution widen.

(6) Effect of co-catalysts amount on ethylene/1-hexene copolymerization

TABLE 7

Effect of co-catalysts amount on ethylene/1-hexene copolymerization

| Example | Polymerization activity (kgPE/molCr · hr) | Melting point (° C.) | Weight average molecular weight (×10$^5$) | Molecular Weight distribution |
|---|---|---|---|---|
| Example 23-1 | 720 | 127 | 4.3 | 24.3 |
| Example 23-2 | 978 | 126 | 5.5 | 28.6 |
| Example 23-3 | 1048 | 128 | 7.8 | 38.0 |
| Example 23-4 | 998 | 129 | 8.9 | 41.2 |
| Example 23-5 | 986 | 127 | 9.3 | 49.6 |

Polymerization conditions: ethylene pressure=1.0 MPa; polymerization time=1 hr; polymerization temperature 90° C.; n-heptane=200 mL; catalyst amount=200 mg; chromium loading=0.25 wt. %; co-catalyst=TIBA.

According to Table 7, it can be seen that, under the conditions that addition amount of 1-hexene is 3 vol %, the activities of the compounded catalysts in ethylene homopolymerization firstly increase and then decrease along with the increase of the co-catalyst amount. And along with the increase of the co-catalyst amount, the high molecular weight part of the product continues to increase.

What is claimed is:

1. A supported hybrid vanadium-chromium-based catalyst, characterized in that the catalyst is supported on a porous inorganic carrier and wherein an organic Cr active site and V active site are present on the porous inorganic carrier at the same time; wherein the organic Cr active site is in a form of

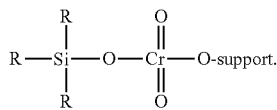

wherein each R is identical or different from each other and is a hydrocarbyl radical containing from 1 to 14 carbon atoms; and wherein a calcined vanadium precursor forms the V active site.

2. The catalyst according to claim 1, wherein the inorganic carrier is selected from the group consisting of silica, alumina, titania, zirconia, magnesia, calcium oxide and inorganic clays, and combinations thereof.

3. The catalyst according to claim 2, wherein the silica is selected from the group consisting of unmodified or Ti-, Al- or F-modified amorphous porous silica gel.

4. The catalyst according to claim 2, wherein the inorganic carrier has a pore volume of from 0.5 to 5.0 cm$^3$/g.

5. The catalyst according to claim 2, wherein the inorganic carrier has a surface area of from 50 to 600 m$^2$/g.

6. The catalyst according to claim 1, wherein the vanadium precursor of the V active site is selected from the group consisting of vanadic nitrate, vanadic phosphate, vanadic sulfate, vanadic acetate, ammonium hexafluorovanadate, vanadic acetate, vanadic nitrate, vanadyl oxalate, ammonium metavanadate, vanadyl sulfate, vanadium sulfate oxide hydrate, vanadic sulfate, vanadyl trichloride, sodium orthovanadate, sodium metavanadate, vanadyl bis(acetylacetone), vanadic triisopropoxide oxide, vanadic oxytripropoxide, vanadic acetylacetone, vanadic oxytriethoxide, vanadyl chloride, vanadic silicide, and combinations thereof.

7. The catalyst according to claim 1, wherein an organic chromium precursor of the organic Cr active site is a compound of the following formula

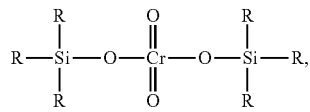

wherein R, which is identical or different from each other, is a hydrocarbyl radical containing from 1 to 14 carbon atoms.

8. The catalyst according to claim 7, wherein R is an alkyl radical or an aryl radical containing 1 to 14 carbon atoms.

9. The catalyst according to claim 7, wherein the organic chromium precursor is selected from the group consisting of bis-trimethylsilylchromate, bis-triethylsilylchromate, bis-tributylsilylchromate, bis-triisopentylsilylchromate, bis-tri-2ethylhexylsilylchromate, bis-tridecylsilylchromate, bis-tri (tetradecyl) silylchromate, bis-tribenzylsilylchromate, bis-triphenethylsilylchromate, bis- triphenylsilylchromate, bis-tritolylsilylchromate, bis-trixylylsilylchromate, bis-trinaphthylsilylchromate, bis-triethylphenylsilylchromate, bis-trimethyl-naphthylsilylchromate, polydiphenylsilylchromate, polydiethylsilylchromate, and combinations thereof.

10. The catalyst according to claim 1, wherein the chromium loading on the inorganic carrier is, based on the weight of chromium, from 0.01 to 10.00 wt. % of the total weight of the catalyst.

11. The catalyst according to claim 1, wherein the chromium loading on the inorganic carrier is, based on the weight of the chromium, from 0.01 to 10.00 wt. %, based on the weight of chromium and vanadium.

* * * * *